United States Patent
McDade

(10) Patent No.: US 10,410,192 B2
(45) Date of Patent: Sep. 10, 2019

(54) USER INTERFACE FOR CONTROLLING MULTIPLE DEVICES

(71) Applicant: NCR Corporation, Duluth, GA (US)

(72) Inventor: Fiona McDade, Dundee (GB)

(73) Assignee: NCR Corporation, Atlanta, GA (US)

( * ) Notice: Subject to any disclaimer, the term of this patent is extended or adjusted under 35 U.S.C. 154(b) by 1016 days.

(21) Appl. No.: 14/869,040

(22) Filed: Sep. 29, 2015

(65) Prior Publication Data

US 2017/0091728 A1 Mar. 30, 2017

(51) Int. Cl.
*G06Q 40/00* (2012.01)
*G06Q 20/10* (2012.01)
*G06F 3/0481* (2013.01)
*G06Q 20/38* (2012.01)
*G06Q 20/40* (2012.01)

(52) U.S. Cl.
CPC ....... *G06Q 20/1085* (2013.01); *G06F 3/0481* (2013.01); *G06Q 20/382* (2013.01); *G06Q 20/40* (2013.01)

(58) Field of Classification Search
USPC .......................................................... 705/43
See application file for complete search history.

(56) References Cited

U.S. PATENT DOCUMENTS

| | | | |
|---|---|---|---|
| 2003/0126079 A1* | 7/2003 | Roberson | G06Q 10/06 705/40 |
| 2011/0313923 A1* | 12/2011 | Votaw | G06F 21/31 705/43 |
| 2014/0297433 A1* | 10/2014 | Bielamowicz | G06Q 20/401 705/18 |
| 2014/0297526 A1* | 10/2014 | Martin | G07F 19/211 705/42 |

* cited by examiner

*Primary Examiner* — Hani M Kazimi
*Assistant Examiner* — Hatem M Ali
(74) *Attorney, Agent, or Firm* — Schwegman, Lundberg & Woessner

(57) ABSTRACT

Embodiments of a system and method for displaying a user interface for controlling multiple devices are generally described herein. A method may include displaying a user interface, the user interface including reserve amounts for a plurality of Self-Service Terminals (SSTs) and a Teller Cash Recycler (TCR), and determining a device to complete a transaction from the plurality of SSTs and the TCR. The method may include, in response to determining the device is the TCR, instructing the TCR to complete the transaction, and in response to determining the device is a SST from the plurality of SSTs, instructing the SST to complete the transaction.

9 Claims, 4 Drawing Sheets

USER INTERFACE FOR CONTROLLING MULTIPLE DEVICES

BACKGROUND

Bank branches are increasingly being re-imagined to balance improved customer service with lower running costs. Some solutions to balancing these interests include self-service and assisted-service devices. Other solutions use staff driven branch transactions to resolve customer needs. While these solutions provide a bank branch system, they do not have the capability of giving a combined view for staff across devices. The current solutions also fail to provide for staff control across multiple devices and multiple types of devices.

SUMMARY

In various embodiments, methods and systems for displaying a user interface for controlling multiple devices and multiple types of devices are presented.

According to an embodiment, a method may include displaying a user interface, the user interface including reserve amounts for a plurality of Self-Service Terminals (SSTs) and a Teller Cash Recycler (TCR), and determining a device to complete a withdrawal from the plurality of SSTs and the TCR. The method may include, in response to determining the device is the TCR, instructing the TCR to dispense the specified amount to a teller, and in response to determining the device is a SST from the plurality of SSTs, instructing the SST to dispense the specified amount to a customer.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A bank branch uses Self-Service Terminals (SSTs), such as Interactive Teller Machines (ITMs) or Automated Teller Machines (ATMs) and Teller Cash Recyclers (TCRs) to dispense cash to customers. SSTs may be used by a customer with or without teller assistance, ITMs may be used with teller assistance, and TCRs require full service from a teller to use. When large transactions are needed, TCRs may be used, and when smaller transactions are needed, SSTs may be used. In an example, a SST may be limited to dispensing only up to a first specified amount without teller assistance (e.g., up to $300) and a second specified amount with teller assistance (e.g., up to $1,000). In another example, a TCR may be used for high value transactions, which a TCR may be better designed to handle. Transactions may include withdrawals, deposits, transfers, or other banking activities.

Figure 1:
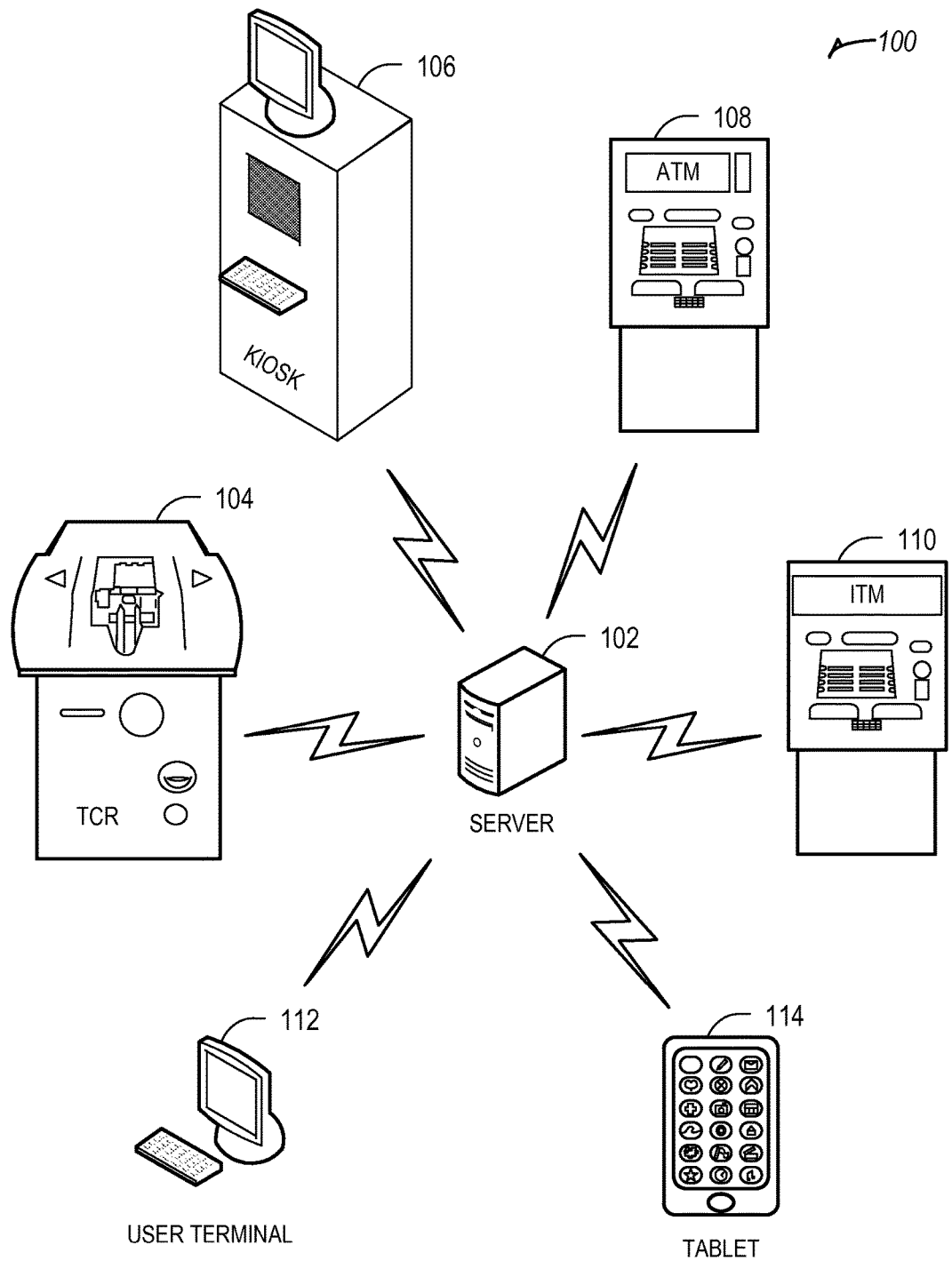
FIG. 1 illustrates generally a system for controlling multiple devices in accordance with some embodiments.

FIG. 1 illustrates generally a system 100 for controlling multiple devices and multiple types of devices in accordance with some embodiments. The system 100 represents an end-to-end way for a teller or other bank staff member to view and control a plurality of devices. The system 100 may allow a bank staff member to easily transition between being an adviser, a customer service representative, and a teller. In an example, system 100 includes a plurality of devices, such as a TCR 104, kiosk 106, ATM 108, ITM 110, user terminal 112, tablet 114, etc. The various devices described in system 100 may include SSTs, or may include assisted devices. For example, the kiosk 106, ATM 108, and ITM 110, may be SSTs, and the TCR 104 may be a teller user only device. User terminal 112 and tablet 114 may be assisted devices that may be used by a customer, teller, or both.

In an example, a customer may desire to withdraw funds at a bank branch. The customer may have different types of requirements for a transaction, such as speed, simplicity, accuracy, etc. For the different types of requirements, a transaction may use different devices. For example, for a customer that wants speedy service, a SST without assistance from an employee may be the fastest option, but for a customer that wants accuracy, using a device with assistance from an employee may be preferable. The system 100 may be used to control one or more of these devices remotely.

In an example, the user terminal 112 or the tablet 114 is used by an employee of a bank branch to access system 100 and control one or more SSTs, such as the ATM 108, ITM 110, kiosk 106, or TCR 104. For example, a customer may access account information using the tablet 114, and an employee may then use the tablet 114 to choose either the TCR 104 or the ATM 108 to dispense a requested amount to be withdrawn. The TCR 104 may be selected (e.g., by an employee or automatically by the system 100) when the requested amount exceeds a threshold and the ATM 108 may be selected when the requested amount is less than the threshold. In another example, the system 100 may select a SST for a specified transaction and the system 100 may display the selection on one of the devices. For example, the tablet 114 may be used to display a specific SST that a customer should use to complete a transaction. The transaction may be started at the tablet 114 and completed at a SST, or the system 100 may direct a customer to the specific SST based on cash balance values, waiting times, service schedules, or the like at the various SSTs.

System 100 may include a server 102 that may be used to control the various devices. The server 102 may include controlling a user interface, displayed on one or more of the devices, to enable transactions for these devices to be processed through different channels, such as SSTs, TCR, etc. The server may run system 100, including storing cash values, waiting times, service schedules, etc., or may receive such information on the fly from the various devices of system 100 and determine how a specific transaction will be completed.

In an example, specific devices in system 100, such as server 102, TCR 104, the kiosk 106, ATM 108, ITM 110, user terminal 112, tablet 114, and other SSTs may be switched out, not used, or have multiple versions. The devices may be integrated into system 100 without affecting other devices in the system 100. System 100 may include the flexibility to update devices on-the-fly and offer optimal customer interactions based on the devices actually connected to the system 100 at a given point in time. System 100 may be used with devices from different manufacturers or running different software from each other.

Figure 2:
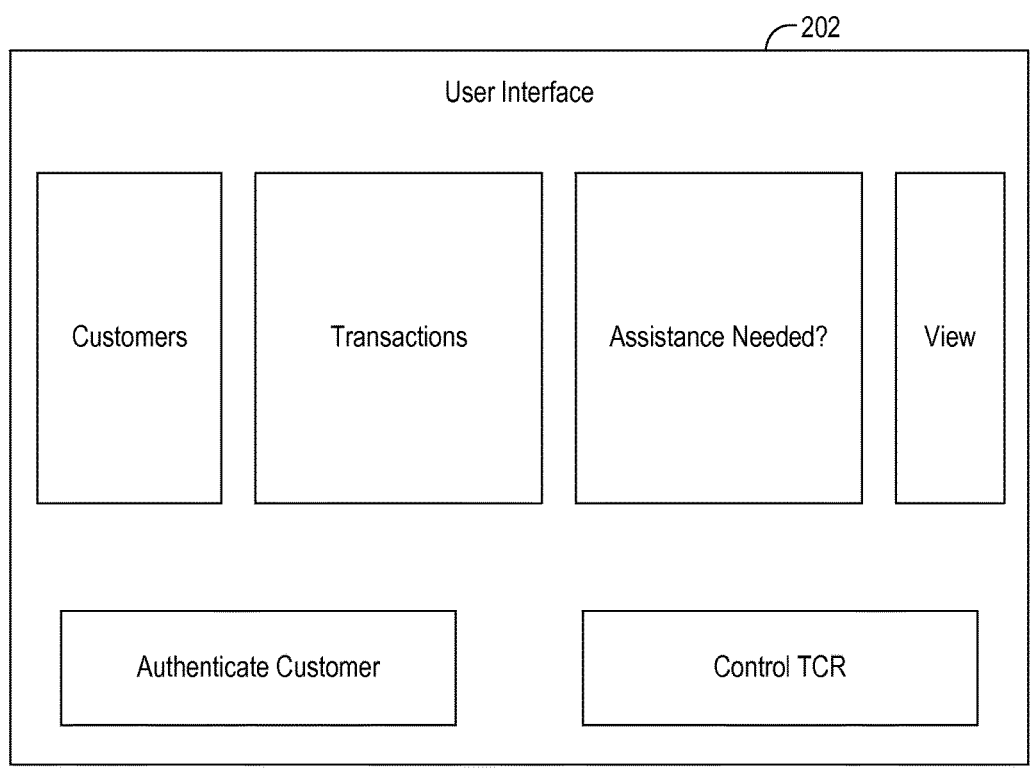
FIG. 2 illustrates generally a user interface displaying multiple controlled devices in accordance with some embodiments.

FIG. 2 illustrates generally a user interface 202 displaying multiple controlled devices in accordance with some embodiments. The user interface 202 may display customers interacting with SSTs, on-going transactions, completed transactions, customers waiting to interact with a SST or TCR, customers needing assistance, device lists, currency availability, accessibility options or requirements, authentication options such as to verify a customer, SST or TCR controls, or the like. The user interface 202 may be staff viewable and controllable. In an example, the user interface 202 includes an option for authenticating a customer. For example, a customer may log in using the user interface 202 and be directed to a SST, where a transaction may be completed, or directed to use a TCR (e.g., via a staff member) to complete a transaction. The user interface 202 may allow the staff member to see who is transacting, what the transactions is, or any requirement to assist. In another example, the user interface 202 may be used to control a TCR when required.

In an example, the user interface 202 is used by a customer to authenticate themselves through a self-service device or via an encrypted pin pad on a tablet. A staff member may view customer accounts and then control a TCR to fulfill a transaction for the customer, using the user interface 202. The user interface 202 may be used both by a staff member and a customer with different features available.

The user interface 202 may provide one view of all devices in use and available, (e.g., including various ATMs, TCRs, ITMs, kiosks, other tablets, etc.). The user interface 202 may provide simple branch staff levels of stock on hand so that a staff member may have a view of a state for all devices. In another example, a staff member may be assigned a set of devices to monitor using the user interface 202, and other staff members may be assigned other sets of devices, which may include overlapping devices.

In an example, a customer may request a large withdrawal. The large withdrawal may have been reserved in advance. The user interface 202 may be used to access a TCR to fulfill the large withdrawal request and complete the transaction. A staff member may use the user interface 202 as a single system that can address both types of transactions: Self-Service or Assisted-Service withdrawals, as well as deposits through a traditional ATM or SST or larger cash deposit and withdrawals driven by a staff member using a TCR.

In another example, the user interface 202 may show cash totals across the entire device estate of a branch to enable staff to balance various devices. In yet another example, the user interface 202 may alert a staff member to fill devices with low balances, or direct customer traffic to ensure cash balancing for the devices.

Figure 3:
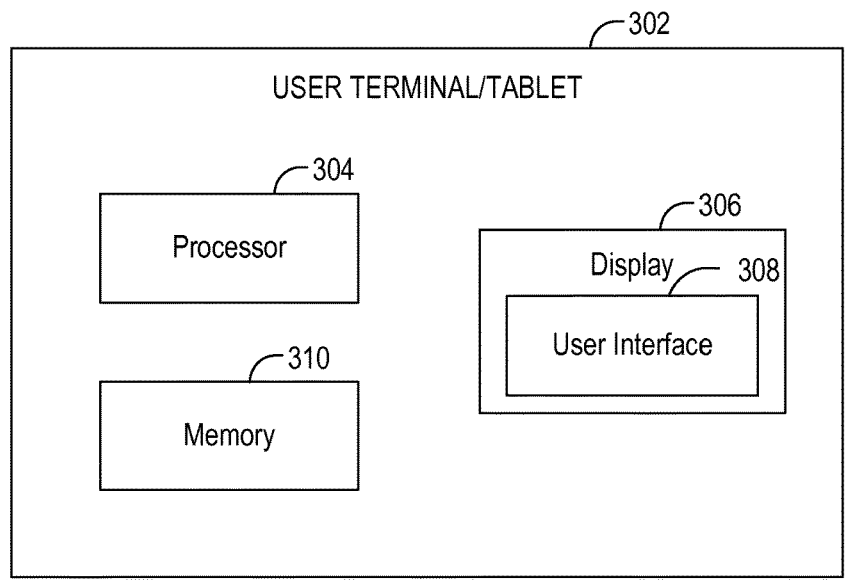
FIG. 3 illustrates generally a system including a user terminal or tablet for displaying a user interface view of a multiple device system in accordance with some embodiments.

FIG. 3 illustrates generally a system 302 including a user terminal or tablet for displaying a user interface 308 view of a multiple device system in accordance with some embodiments. The system 302 may include a processor 304, memory 310, a display 306, and a user interface 308 on the display 306. The system 302 may be run on a single device, such as a user terminal or tablet, or run on multiple devices, such as partially on a server, and partially on a user terminal or tablet.

In an example, the system 302 may include one or more processors (e.g., processor 204) coupled to a memory device, such as memory 310, the memory device containing instructions that, when executed by the one or more processors, cause the system 302 to perform operations, such as those described below. The system 302 may include using the processor to display the user interface 308, on the display 306, the user interface 308 including reserve amounts for a plurality of Self-Service Terminals (SSTs) and a Teller Cash Recycler (TCR). The system 302 may include using the processor 304 to determine a device to complete a withdrawal from the plurality of SSTs and the TCR. The system 302 may include using the processor 304 to, in response to determining the device is the TCR, instructing the TCR to dispense the specified amount to a teller, and in response to determining the device is a SST from the plurality of SSTs, instructing the SST to dispense the specified amount to a customer.

In an example, the operations include using the processor 304 to determine the device is the TCR by determining that the specified amount exceeds a threshold. In another example, the processor 304 display, on the display 306, a plurality of on-going customer interactions with the plurality of SSTs. In yet another example, the SST may include an ATM, an ITM, or a kiosk.

The operations may include using the processor 304 to determine that the SST or the TCR is low on currency or out of currency. For example, an ATM, ITM, or TCR may run low on currency, and the system 302 may determine that the device cannot complete a customer transaction or that the transaction will put the device at a low balance. The system 302 may alert a staff member who can redirect a customer to a different device. In an example, the system 302 may alert a staff member before a customer arrives at a device so that the staff member may direct the customer to a well-stocked device. In another example, the system 302 may alert a staff member that the TCR is low or out of currency. The staff member may fill the TCR (e.g., from a night vault). This may be a useful option when SSTs are running low, since they may not be able to be filled by a staff member.

Figure 4:
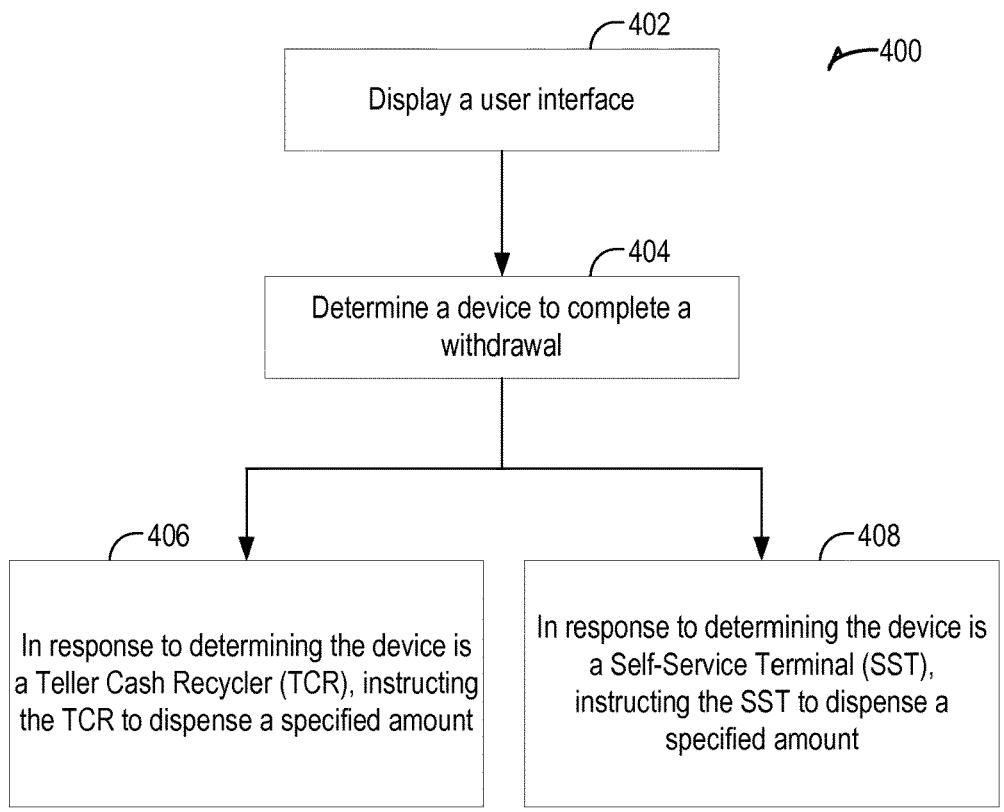
FIG. 4 illustrates generally a flowchart showing a technique for displaying a user interface for controlling multiple devices in accordance with some embodiments.

FIG. 4 illustrates generally a flowchart showing a technique 400 for displaying a user interface for controlling multiple devices in accordance with some embodiments.

The technique 400 includes an operation 402 to display a user interface. The user interface may include reserve amounts for one or more SSTs and one or more TCRs. The user interface may include pending or completed transactions, customer interactions, customer credentials, or customer accounts. The user interface may be interactive and allow a staff member to interact with a customer at the one or more SSTs or the one or more TCRs. In an example, the user interface allows a customer to login. After logging in, the user interface may present a specific SST or TCR to complete a transaction.

The technique 400 includes an operation 404 to determine a device to complete a withdrawal. The specific device, such as a SST or TCR may be determined and selected based on various factors such as wait time, functionality (e.g., not currently malfunctioning), accessibility, available features, amount of currency available, or the like. Operation 404 may include determining a device that includes a reserve amount that exceeds a specified amount requested to be withdrawn. The technique 400 includes an operation 406 to, in response to determining the device is a TCR, instructing the TCR to dispense a specified amount. The technique 400 includes an operation 408 to, in response to determining the device is a SST, such as an ATM or ITM, instructing the SST to dispense a specified amount. For example, a TCR may carry more currency than a SST, and if a request for a withdrawal includes an amount greater than the SST carries, the TCR may be selected. In another example, the technique 400 selects from among different SSTs depending on the currency within the different SSTs. For example, a SST may be selected if it has a greater currency than other SSTs, which may help balance the available currencies in the different SSTs and prevent a SST from getting too low to be used by a customer. The currency dispensing balancing of the different SSTs may be combined with using a TCR for large withdrawals, since a TCR may be filled by a staff member, and a TCR typically carries more currency than a SST.

Figure 5:
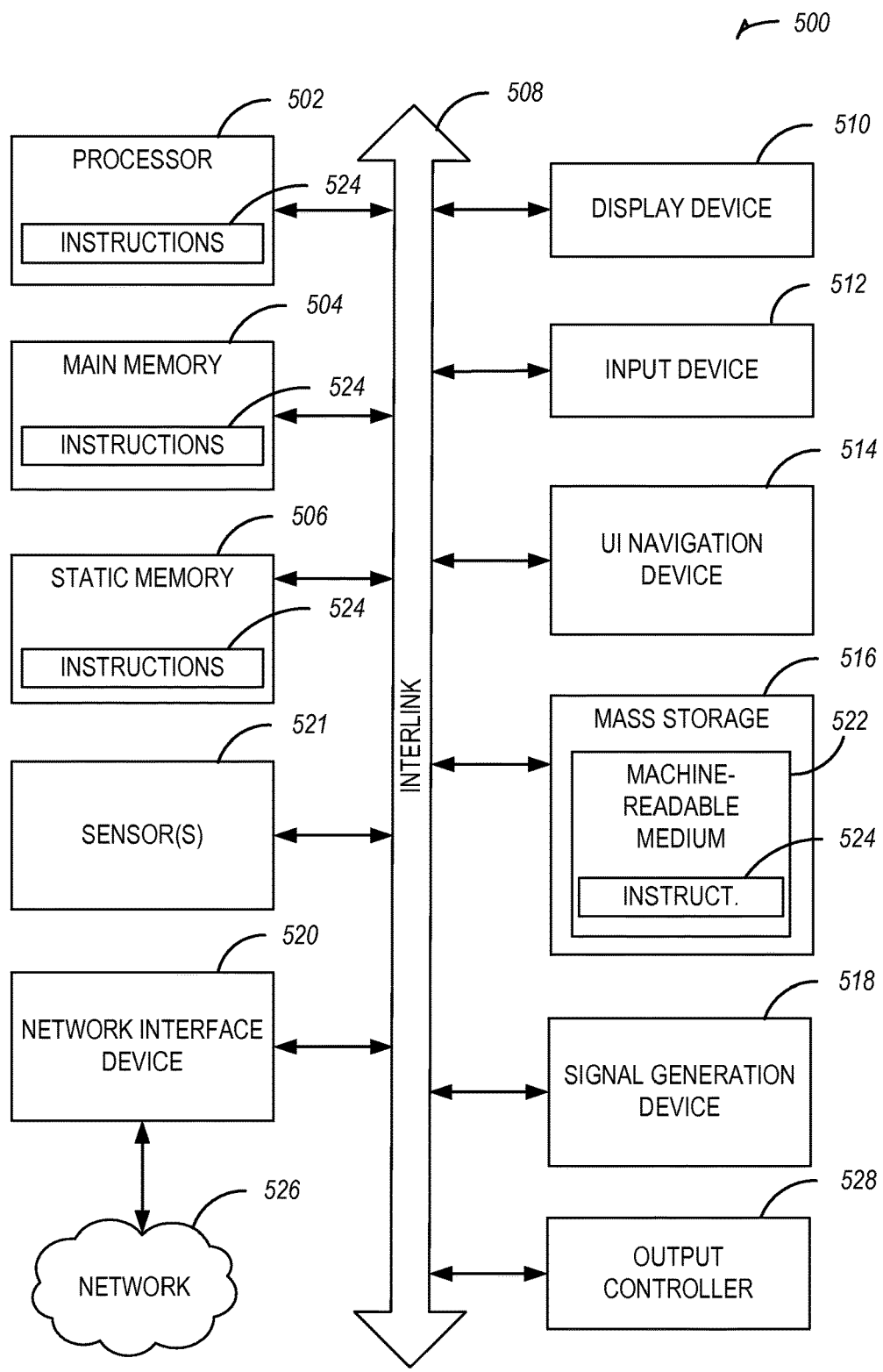
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Various Notes & Examples

Each of these non-limiting examples may stand on its own, or may be combined in various permutations or combinations with one or more of the other examples.

Example 1 includes the subject matter embodied by a method for displaying a user interface for controlling multiple devices, the method comprising: displaying the user interface, the user interface including reserve amounts for a plurality of Self-Service Terminals (SSTs) and a Teller Cash Recycler (TCR); determining a device to complete a transaction from the plurality of SSTs and the TCR; in response to determining the device is the TCR, instructing the TCR to complete the transaction; and in response to determining the device is a SST from the plurality of SSTs, instructing the SST to complete the transaction.

In Example 2, the subject matter of Example 1 may optionally include receiving login credentials for a customer before instructing the SST to complete the transaction.

In Example 3, the subject matter of one or any combination of Examples 1-2 may optionally include receiving an indication, the indication including information about the transaction, wherein the information about the transaction includes a request for a withdrawal of a specified amount.

In Example 4, the subject matter of one or any combination of Examples 1-3 may optionally include wherein determining the device includes determining the device based on the specified amount.

In Example 5, the subject matter of one or any combination of Examples 1-4 may optionally include wherein determining the device is the TCR includes determining that the specified amount exceeds a threshold.

In Example 6, the subject matter of one or any combination of Examples 1-5 may optionally include wherein when the specified amount exceeds a threshold, determining whether the specified amount has been pre-reserved by a customer before instructing the TCR to dispense the specified amount.

In Example 7, the subject matter of one or any combination of Examples 1-6 may optionally include wherein determining the device is the SST includes determining that the specified amount is less than the threshold.

In Example 8, the subject matter of one or any combination of Examples 1-7 may optionally include specifying the SST from a plurality of SSTs within a branch.

In Example 9, the subject matter of one or any combination of Examples 1-8 may optionally include displaying an alert when any SST in the plurality of SSTs malfunctions or contains a low balance.

In Example 10, the subject matter of one or any combination of Examples 1-9 may optionally include displaying, on a display device, a plurality of on-going customer interactions with the plurality of SSTs.

In Example 11, the subject matter of one or any combination of Examples 1-10 may optionally include receiving an assistance request from a customer; and displaying the assistance request to a teller on the display device.

In Example 12, the subject matter of one or any combination of Examples 1-11 may optionally include wherein determining the device includes receiving an indication from a teller to dispense a specified amount.

Example 13 includes at least one machine-readable medium including instructions for receiving information, which when executed by a machine, cause the machine to perform any of the methods of Examples 1-12.

Example 14 includes an apparatus comprising means for performing any of the methods of Examples 1-12.

Example 15 includes the subject matter embodied by a method for displaying a user interface for controlling multiple devices, the method comprising: displaying the user interface, on a display device, the user interface including a plurality of on-going customer interactions with a plurality of Self-Service Terminals (SSTs) and reserve amounts for the plurality of SSTs and a Teller Cash Recycler (TCR), determining, using a processor coupled to the display device, whether to use an SST from the plurality of SSTs or the TCR to complete a withdrawal by determining whether a specified amount to be withdrawn exceeds a threshold, in response to determining the specified amount exceeds the threshold, instructing the TCR to dispense the specified amount to a teller, and in response to determining the specified amount is less than the threshold, instructing the SST to dispense the specified amount to a customer.

In Example 16, the subject matter of Example 15 may optionally include receiving login credentials for the customer before instructing the SST to dispense the specified amount to the customer.

In Example 17, the subject matter of one or any combination of Examples 15-16 may optionally include receiving an indication from the customer, the indication requesting withdrawal of the specified amount.

In Example 18, the subject matter of one or any combination of Examples 15-17 may optionally include wherein the SST includes an Automated Teller Machine (ATM).

Example 19 includes the subject matter embodied by a system for displaying a user interface for controlling multiple devices, the system comprising: a display, one or more processors coupled to a memory device, the memory device containing instructions that, when executed by the one or more processors, cause the system to perform operations comprising: displaying the user interface, on the display, the user interface including reserve amounts for a plurality of Self-Service Terminals (SSTs) and a Teller Cash Recycler (TCR), determining a device to complete a withdrawal from the plurality of SSTs and the TCR, in response to determining the device is the TCR, instructing the TCR to dispense the specified amount to a teller, and in response to determining the device is a SST from the plurality of SSTs, instructing the SST to dispense the specified amount to a customer.

In Example 20, the subject matter of Example 19 may optionally include wherein the operations comprising determining the device is the TCR include operations comprising determining that the specified amount exceeds a threshold.

In Example 21, the subject matter of one or any combination of Examples 19-20 may optionally include wherein the operations further comprise displaying a plurality of on-going customer interactions with the plurality of SSTs.

In Example 22, the subject matter of one or any combination of Examples 19-21 may optionally include wherein the SST includes an Automated Teller Machine (ATM).

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for displaying a user interface for controlling multiple devices, the method comprising:
   displaying the user interface, on a display device, the user interface including reserve amounts for a plurality of Self-Service Terminals (SSTs) and a Teller Cash Recycler (TCR);
   receiving, through the user interface, a request to withdraw a requested amount of cash;
   automatically comparing, using a processor coupled to the display device, the requested amount to a threshold amount and to the reserve amounts;
   automatically determining, using the processor, that the requested amount exceeds the threshold amount but is less than the reserve amount for the Teller Cash Recycler (TCR);
   automatically selecting, using the processor, the Teller Cash Recycler (TCR) to dispense the requested amount of cash; and
   automatically sending the Teller Cash Recycler (TCR) a data signal that instructs the Teller Cash Recycler (TCR) to dispense the requested amount of cash to a teller.

2. The method of claim 1, further comprising:
   determining that the specified amount has been pre-reserved by a customer before instructing the TCR to dispense the requested amount of cash to the teller.

3. A method for displaying a user interface for controlling multiple devices, the method comprising:
   displaying the user interface, on a display device, the user interface including reserve amounts for a plurality of Self-Service Terminals (SSTs) and a Teller Cash Recycler (TCR);
   receiving, through the user interface, a request to withdraw a requested amount of cash;
   automatically comparing, using a processor coupled to the display device, the requested amount to a threshold amount and to the reserve amounts;
   automatically determining, using the processor, that the requested amount is less than the threshold amount and is less than the reserve amount for a first Self-Service Terminal (SST) of the plurality of Self-Service Terminals (SSTs);
   automatically selecting, using the processor, the first Self-Service Terminal (SST) to dispense the requested amount of cash; and
   automatically sending the first Self-Service Terminal (SST) a data signal that instructs the first Self-Service Terminal (SST) to dispense the requested amount of cash to a customer.

4. The method of claim 3, wherein the plurality of Self-Service Terminals (SSTs) are all located within a same branch.

5. The method of claim 3,
   wherein the request is received from the customer; and
   further comprising receiving login credentials for the customer before sending the data signal to the first Self-Service Terminal (SST) to dispense the requested amount of cash to the customer.

6. The method of claim 3, wherein the first Self-Service Terminal (SST) is an Automated Teller Machine (ATM).

7. A system for displaying a user interface for controlling multiple devices, the system comprising:
   a display;
   one or more processors coupled to a memory device, the memory device containing instructions that, when executed by the one or more processors, cause the system to perform operations comprising:
   displaying the user interface, on the display, the user interface including reserve amounts for a plurality of Self-Service Terminals (SSTs) and a Teller Cash Recycler (TCR);
   receiving, through the user interface, a request to withdraw a requested amount of cash;
   automatically comparing, using a processor coupled to the display device, the requested amount to a threshold amount and to the reserve amounts;
   automatically determining, using the processor, that the requested amount exceeds the threshold amount but is less than the reserve amount for the Teller Cash Recycler (TCR);
   automatically selecting, using the processor, the Teller Cash Recycler (TCR) to dispense the requested amount of cash; and
   automatically sending the Teller Cash Recycler (TCR) a data signal that instructs the Teller Cash Recycler (TCR) to dispense the requested amount of cash to a teller.

8. The system of claim 7, wherein the operations further comprise determining that the specified amount has been pre-reserved by a customer before instructing the TCR to dispense the requested amount of cash to the teller.

9. The system of claim 7, wherein the plurality of Self-Service Terminals (SST) are all located within a same branch.

* * * * *